US005211312A

United States Patent [19]

Chang

[11] Patent Number: 5,211,312
[45] Date of Patent: May 18, 1993

[54] CAULK DISPENSING DEVICE WITH THUMB-CONTROL LOCK

[76] Inventor: Peter J. Y. Chang, 11001 Petersborough Dr., Rockville, Md. 20852

[21] Appl. No.: 783,276
[22] Filed: Oct. 28, 1991
[51] Int. Cl.⁵ .......................... B67D 5/42; G01F 11/00
[52] U.S. Cl. .................................... 222/153; 222/327; 222/386; 222/391
[58] Field of Search ............... 222/153, 323, 326, 327, 222/386, 389-391

[56] References Cited

U.S. PATENT DOCUMENTS

| | | | |
|---|---|---|---|
| 1,986,166 | 1/1935 | Schneider | 222/391 X |
| 2,070,206 | 2/1937 | Hudson | 222/327 X |
| 2,079,744 | 5/1937 | Maguire | 222/326 |
| 2,309,446 | 1/1943 | Ekkebus | 222/386 X |
| 2,786,604 | 3/1957 | Collins | 222/327 X |
| 2,933,221 | 4/1960 | Rand et al. | 222/391 |
| 3,176,595 | 4/1965 | Schwartz | 222/386 X |
| 3,188,057 | 6/1965 | Trumbull | 222/391 X |
| 3,229,865 | 1/1966 | Heisler et al. | 222/391 |
| 3,409,185 | 11/1968 | Sundholm | 222/326 |
| 3,501,063 | 3/1970 | Sundholm | 222/326 |
| 3,612,359 | 10/1971 | Sundholm | 222/386 X |
| 3,980,209 | 9/1976 | Collar | 222/323 |
| 4,269,330 | 5/1981 | Johnson | 222/386 |
| 4,311,258 | 1/1982 | Bradshaw | 222/391 |
| 4,356,935 | 11/1982 | Kamin | 222/327 X |
| 4,437,591 | 3/1984 | von Schuckmann | 222/391 |
| 4,461,403 | 7/1984 | Prahs | 222/391 X |
| 4,669,636 | 6/1987 | Miyata | 222/153 |
| 4,673,106 | 6/1987 | Fishman | 222/391 X |
| 4,706,853 | 11/1987 | Stonesifer et al. | 222/391 |
| 4,741,462 | 5/1988 | Schneider, Jr. | 222/386 |
| 4,840,293 | 6/1989 | Segatz | 222/386 X |
| 4,848,598 | 7/1989 | McKinney | 222/391 |

FOREIGN PATENT DOCUMENTS

| | | | |
|---|---|---|---|
| 669165 | 2/1989 | Switzerland | 222/327 |

*Primary Examiner*—Kevin P. Shaver
*Attorney, Agent, or Firm*—Leonard Bloom

[57] ABSTRACT

A caulk dispensing gun having a rotatable barrel and a barrel rotation lock which allows smooth and unencumbered 360° bi-directional rotation, and convenient locking at any angular position during rotation of the barrel. The caulk dispensing gun also has a piston assembly which is especially suited for use in a rotatable barrel.

15 Claims, 3 Drawing Sheets

CAULK DISPENSING DEVICE WITH THUMB-CONTROL LOCK

FIELD OF THE INVENTION

The present invention relates to improvements in caulk dispensing devices of the type which employ a rotatable barrel (or chamber) to permit caulking at angles, and more particularly, to a thumb-control lock which allows convenient restriction of barrel rotation and an improved piston assembly.

DESCRIPTION OF THE BACKGROUND

Dispensing devices for dispensing caulk and related compounds commonly employ a dispensing tip having an orifice which is formed or cut at an angle. This way, the angled edge of the dispensing tip can be used as a spatula for spreading and/or infusing the compound as it is being dispensed. This is best accomplished when the dispensing gun is held at an angle in order to keep the tip flush against the caulking surface. Unfortunately, unless one is caulking a straight line, it becomes awkward to maneuver the gun past curves and around corners.

For this reason, some dispensing guns are now equipped with rotatable barrels. One need only rotate the barrel while navigating corners in order to keep the dispensing tip flush against the caulking surface. The rotatable barrel makes it possible to apply a uniform and continuous bead of caulk even around corners.

Notwithstanding the great advantage, the rotatable barrel engenders one inherent inconvenience. It is necessary to keep a hand on the barrel to prevent it from rotating whenever rotation is not desired. This requirement prevents one-handed operation of the dispensing gun. The operator no longer has a free hand to maintain balance, clean the caulking path, smooth or remove excess caulk, or any of the numerous other tasks which could otherwise be performed during caulking.

For this reason, a number of barrel rotation locks have been developed to lock the barrel in position when rotation is no longer desired. In the simplest form, these barrel rotation locks take the form of threaded collars on the barrel which may be tightened to increase resistance to rotation. However, the collars generally defeat the purpose of the rotatable barrel. In order to lock or unlock the barrel, the dispensing gun must first be withdrawn from the work surface, and the operator must then turn the collar with his/her free hand. Consequently, the line of caulk is broken.

Since it is often of paramount importance to maintain a smooth and continuous line of caulk, more elaborate barrel rotation locks have been developed which partially solve the above-described problem. For example, Miyata U.S. Pat. No. 4,669,636 discloses a cartridge-type dispensing gun with a rotatable barrel and lock. The barrel of the gun is connected to the housing by a joint assembly which incorporates a lock for maintaining the barrel in one of a plurality of angular positions about its axis. The lock operates by a retractable ratchet spring which engages the barrel by one of a plurality of notches, thereby latching the barrel in position. The ratchet spring may be operated without removing the gun from the work surface. Hence, the barrel can be rotated while maintaining a continuous bead of caulk. However, the Miyata barrel rotation lock is exceedingly complex and costly to produce. It requires intricate parts and is prone to failure. Moreover, the barrel can be locked only at incremental angular positions, and the additional force required to override each incremental position is sufficient to interrupt or distort the line of caulk.

SUMMARY OF THE INVENTION

It is therefore an object of the present invention to provide a dispensing gun having a rotatable barrel and a barrel rotation lock which is simple and sturdy in design, and which requires a minimum of parts and assembly effort.

It is another object of the invention to provide a barrel rotation lock which allows smooth and unencumbered 360° bi-directional rotation, and locking at any angular position during said rotation.

It is still another object of the invention to provide a thumb-operated barrel rotation lock with convenient switch-like operation between a locked/unlocked barrel, thereby allowing convenient one-hand operation of the dispensing gun.

It is a further object of the invention to provide an improved piston assembly for use in a rotatable barrel dispensing gun as described above.

According to the present invention, the above described and other objects are accomplished by providing an improved caulk dispensing device having a housing with a downwardly extending handle, a trigger pivoted to the housing and compressible against the handle, a rotatable barrel extending from said housing, and a piston and rod assembly driven through said barrel by said trigger for dispensing caulk material. The improvement comprises an on/off thumb-control lock for controlling rotation of said barrel. The thumb control lock includes a receptacle attached to and rotatable with respect to the housing, the barrel being seated therein, gripping means attached to the housing and compressible against the receptacle for preventing rotation of the receptacle and barrel, and a thumb-switch for selectively compressing said gripping means against said receptacle. The thumb-switch is mounted proximate the handle for allowing thumb control of barrel rotation during caulking.

In addition, an improved piston assembly for use in the above-described rotatable barrel dispensing gun is disclosed. The piston assembly includes a unitary circular plunger formed with opposing cupped sides.

BRIEF DESCRIPTION OF THE DRAWINGS

Other features and advantages of the present invention become apparent from the following detailed description of preferred embodiments and certain modifications thereof when taken together with accompanying drawings, in which.

DETAILED DESCRIPTION OF THE PREFERRED EMBODIMENT

Figure 1:
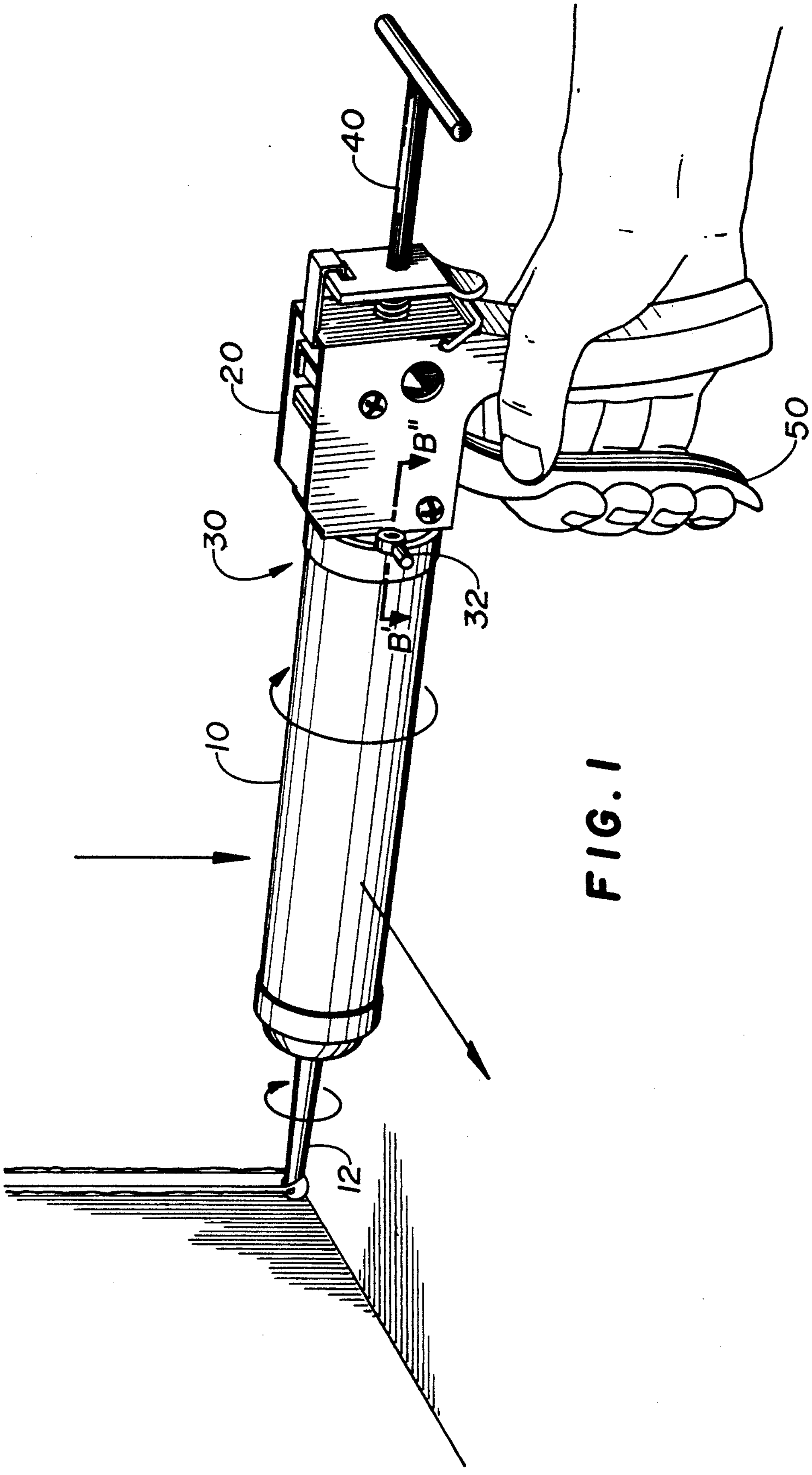
FIG. 1 is a perspective view of a dispensing gun incorporating a rotatable barrel and thumb-control lock according to one embodiment of the present invention.

FIG. 1 is a perspective view of a caulking gun having a rotatable barrel 10 and thumb-control lock. Barrel 10 is attached to a housing 20 by a rotatable/locking coupling 30, and may be rotated about an internal plunger shaft 40 which passes through and extends rearwardly from housing 20.

Plunger shaft 40 may be driven forward through barrel 10 by hand-operation of a trigger 50 for expelling caulk or any other viscous compound. The caulk is expelled through a caulking tip 12 which screws onto barrel 10 and rotates therewith. Caulking tip 12 is provided with an angled orifice for more uniform application of caulking material. More specifically, when a vertical line of caulk is to be applied as shown, the caulking gun is held at a slight downward angle and is moved from top to bottom. This way, the angled dispensing tip 12 acts as a spatula to smooth and/or infuse the caulk. Caulking tip 12 may be rotated with barrel 10 to accommodate changes in the direction of the line of caulk. For instance, if a corner is being caulked (as shown), and the operator wishes to continue the line of caulk to the left, the barrel should be rotated 90° clockwise so that tip 12 remains flush while caulking laterally in a right-to-left direction. This way, the line of caulk can be continued without interrupting the position in which the dispensing gun is held. Similarly, barrel 10 should be rotated another 90° at each subsequent corner in order to complete a smooth and unbroken line of caulk throughout an entire rectangular path.

The rotatable/locking coupling 30 of the caulking gun of FIG. 1 includes an on/off thumb-control switch 32 which locks and unlocks barrel 10 in any desired angular position during the caulking operation. As described, coupling 30 and thumb-control switch 32 allow adjustment of the orientation of the angled caulking tip for applying a smoother bead. Thumb-control switch 32 faces rearwardly near trigger 50 to allow the operator to lock barrel 10 in position without breaking the line of caulk. Thumb-control switch 32 can be conveniently toggled between the locked and unlocked position without interrupting operation of trigger 50. As a result, multi-directional caulking can be achieved primarily with a single hand. In contrast to the prior art, the other hand is predominately free for other purposes.

Figure 2:
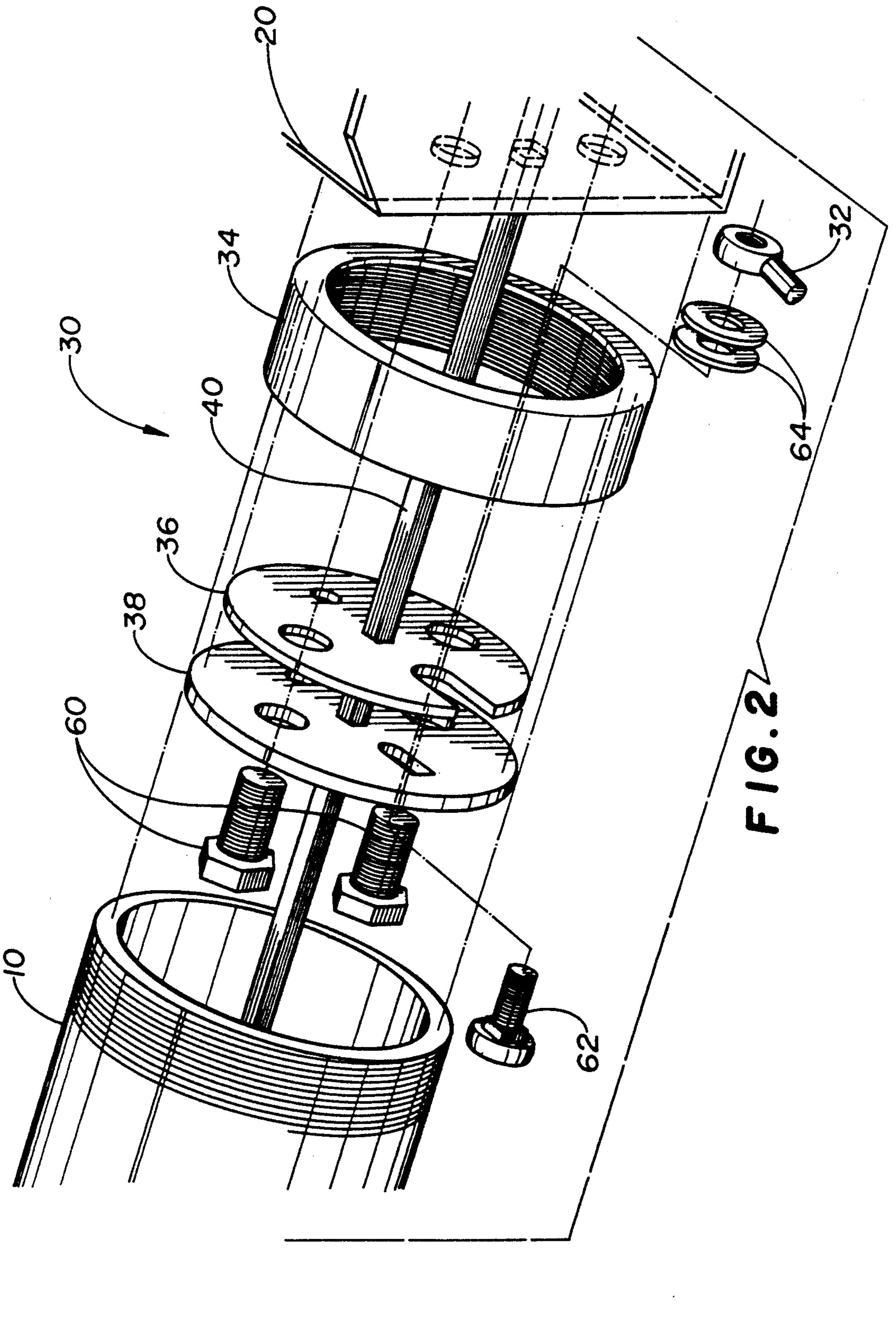
FIG. 2 is an assembly diagram of the rotatable barrel and thumb-control lock of FIG. 1.

FIG. 2 illustrates a detailed assembly diagram of the rotatable/locking coupling 30 of FIG. 1. As shown more clearly in FIG. 2, on/off thumb control switch 32 is a simple two position thumb switch which is located at the rear of the barrel 10 proximate to and on the left side of housing 20. At this location, on/off thumb control switch 32 is within easy reach of the operators thumb. Moreover, a simple rotary action is required to operate on/off thumb control switch 32, and the switching can easily be accomplished simultaneously with operation of the trigger 50. Coupling 30 also includes a flanged collar 34 which encircles plunger shaft 40, and a first retaining plate 36 and second retaining plate 38 each formed with a through-bore by which they are carried on plunger shaft 40.

Retaining plate 36 has a diameter which corresponds to the flange of collar 34. Hence, first retaining plate 36 acts as a bearing surface against the inwardly directed flange, and collar 34 is free to rotate around the first retaining plate 36. Two laterally-offset bore holes are drilled in the first retaining plate 36. These lateral bore holes correspond to threaded holes in housing 20, the first retaining plate 36 is secured to housing 20 by screws passing therethrough. First retaining plate 36 is also provided with a peripheral notch corresponding to the position of thumb switch 32.

Second retaining plate 38 is likewise formed with a central through bore and is carried thereby on plunger shaft 40. Second retaining plate 38 has a diameter which is slightly larger than first retaining plate 36. Consequently, second retaining plate 38 fits within collar 34 and bears against the flange. Second retaining plate 38 also has laterally-spaced through-bores. Both of the first retaining plate 36 and second retaining plate 38 are secured to housing 20 by a pair of screws 60. When the second retaining plate 38 is mounted on housing 20, the first retaining plate 36 is sandwiched between the second retaining plate 38 and housing 20, and collar 34 is rotatably held on the first retaining plate 36.

The second retaining plate 38 is provided with an additional offset through-bore, and the first retaining plate is provided with a peripheral notch at a position corresponding to the on/off thumb control switch 32. A threaded stem 62 is inserted through both of the first and second retaining plates 36 and 38, as shown. A pair of washers 64 are mounted on stem 62, and on/off thumb control switch 32 is screwed to the end of stem 62.

Figure 3:
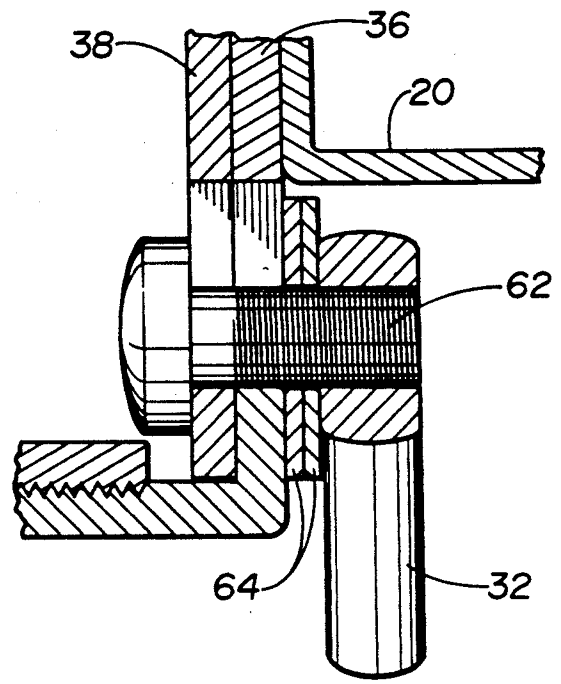
FIG. 3 is a cross-sectional view of the thumb-control lock taken along the line B'—B" of FIG. 1.

FIG. 3 shows a cross-sectional view of the thumb-control lock taken along the line B′—B″ of FIG. 1. As shown, the on/off thumb control switch 32 protrudes outward from collar 34 to the left side of housing 20. In operation, clockwise rotation of on/off thumb control switch 32 will further draw switch 32 onto stem 62. A 90° throw of on/off thumb control switch 32 should be sufficient to compress switch 32 and washers 64 against the flange of collar 34 thereby preventing further rotation. Conversely, counter clockwise rotation of on/off thumb control switch 32 will disengage collar 34, thereby allowing further rotation of barrel 10.

Figure 4:
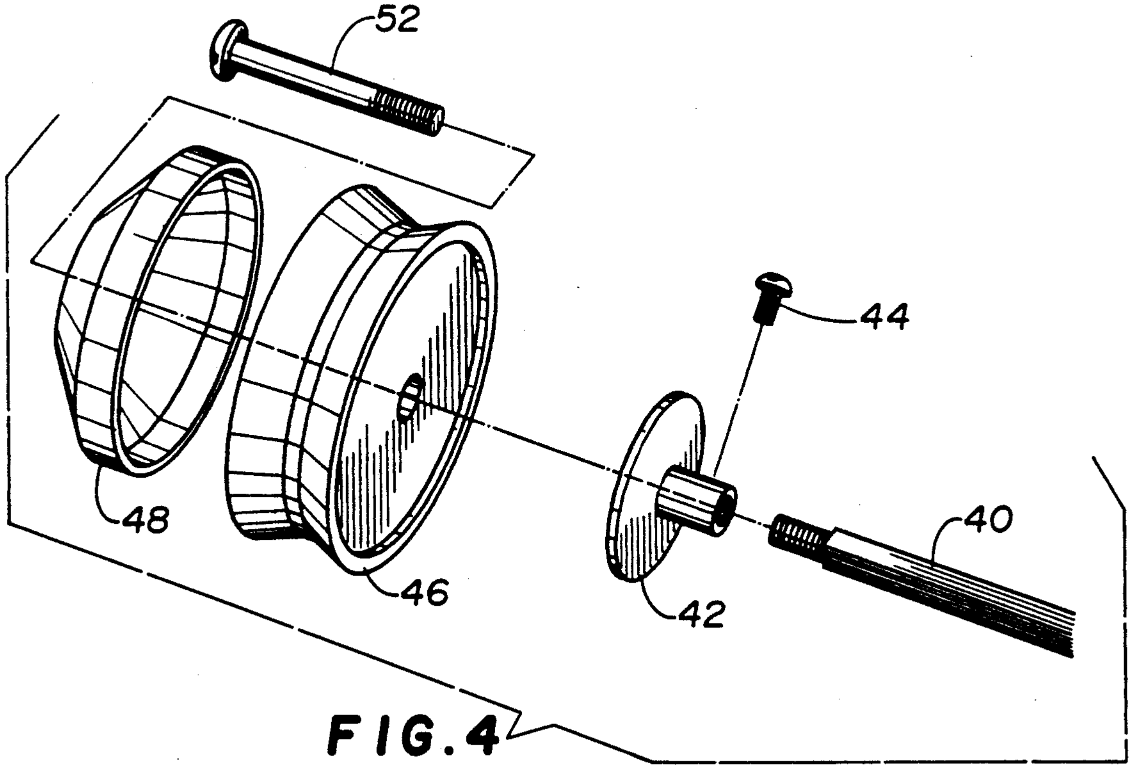
FIG. 4 is an assembly diagram of the dual-cup piston assembly according to the present invention.

FIG. 4 illustrates an improved piston assembly especially suited for use in a rotatable-barrel caulking gun according to the present invention. The piston assembly is mounted at the tip of plunger shaft 40 and slides within barrel 10 for urging caulking material out from dispensing tip 12.

The piston assembly generally includes a base 42 secured to plunger shaft 40 by a locking screw 44, a unitary dual cup piston 46, an ejector cone 48 which insures that the caulking compound is fully expelled from within barrel 10, and a retaining screw 52.

Base 42 includes a mounting stem penetrated by a threaded central bore-hole. Base 42 is screwed onto plunger 40 and is anchored thereon by a locking screw 44. A dual cup plunger 46 is seated on base 42. Dual cup plunger 46 is preferably molded from rubber, such as DuPont Hytrel TM, but may be formed in other ways from other suitable flexible materials. The diameter of dual cup plunger 46 is slightly tapered toward the center, the dual cup plunger 46 being flared outward to create both leading and trailing circles of contact against the inner surface of the barrel 10. The dual areas of contact vastly improve the sealing action of plunger 46 and prevents caulk from escaping rearwardly into barrel 10. In addition, a conical ejector 48 is seated on dual cup plunger 46. Ejector 48 insures that the entirety of caulking compound is expelled from the barrel 10 when the compound is depleted. Finally, a retaining screw 52 is inserted through ejector cone 48 and dual cup plunger 46, and is threaded into base 42 to unite the component parts of the plunger assembly.

The disclosed plunger assembly is extremely rugged and easily manufacturable. When coupled with the on/off thumb control lock, it results in an extremely practical and useful caulking gun.

Having now fully set forth the preferred embodiment and certain modifications of the concept underlying the present invention, various other embodiments as well as certain variations and modifications of the embodiments herein described will obviously occur to those skilled in the art upon becoming familiar with said underlying concept. It is to be understood, therefore, that within the scope of the appended claims, the invention may be practiced otherwise than as specifically set forth herein.

What is claimed is:

1. An improvement in a caulk dispensing device having a housing with a downwardly extending handle, a trigger pivoted to said housing and compressible against said handle, a barrel extending from said housing, said barrel being rotatable with respect to said housing for convenient angular caulking, and a piston and rod assembly driven through said barrel by said trigger for dispensing a compound, the improvement comprising;

an on/off thumb control lock for controlling rotation of said barrel, said thumb control lock further comprising, a rotatable collar in which said barrel is seated;

gripping means compressible against said collar for preventing rotation of said collar and barrel, a thumb-switch for selectively compressing said gripping means against said collar, said thumb-switch being mounted proximate to said handle for allowing thumb-control of barrel rotation during operation of said trigger.

2. The on/off thumb control lock according to claim 1, wherein said gripping means further comprises, a circular plate coaxial with said collar and barrel, said collar being rotatably mounted on said plate, and a clamp mounted on said plate and actuated by said thumb-switch for clamping said collar against said plate, thereby preventing rotation of said collar and barrel.

3. The on/off thumb control lock according to claim 2, wherein said clamp comprises a post having a first end anchored to said plate and a threaded second end extending therefrom, said thumb-switch being threaded on said second end and tightenable toward said plate for compressing said collar therebetween.

4. The on/off thumb control lock according to claim 3, wherein said collar has in inwardly disposed flange overlapping a periphery of said plate and in rotatable contact therewith, said thumb-switch being tightenable toward said plate for compressing said flange therebetween.

5. The on/off thumb control lock according to claim 4, wherein said clamp further comprises at least one washer in bearing contact with said thumb-switch.

6. An improvement in a caulk dispensing device having a housing with a downwardly extending handle, a trigger pivoted to said housing and compressible with said handle, a barrel extending from said housing, and a piston rod driven through said barrel by said trigger for dispensing caulk material, the improvement comprising;

a piston assembly mounted on an end of said piston rod for forcing caulk material from said barrel, said piston assembly having a unitary circular plunger mounted on said end of said piston rod, an ejector cone for depleting said barrel of caulking material, and a screw threaded into said piston rod through said ejector cone and plunger, respectively, for securing said ejector cone and plunger to said piston rod.

7. A caulk dispensing device, comprising:

a housing with a downwardly extending handle;

a trigger pivoted to said housing and compressible with said handle;

a barrel extending from said housing, said barrel being rotatable with respect to said housing for convenient angular caulking;

a piston rod driven through said barrel by said trigger for dispensing caulk material;

a piston assembly mounted on an end of said piston rod for forcing caulk material through said barrel, said piston assembly having a unitary circular plunger; and an on/off thumb control lock for controlling rotation of said barrel, said thumb control lock further comprising, a rotatable collar in which said barrel is seated;

gripping means coupled to said housing and compressible against said collar for preventing rotation of said collar and barrel, a thumb-switch for selectively compressing said gripping means against said collar, said thumb-switch being mounted proximate said handle for allowing selection by thumb during caulking.

8. The caulk dispensing device according to claim 7, wherein said gripping means further comprises, a circular base coaxial with said collar and barrel, said collar being rotatably mounted on said base, and a clamp mounted on said base and actuated by said thumb-switch for clamping said collar against said base, thereby preventing rotation of said collar and barrel.

9. The caulk dispensing device according to claim 8, wherein said clamp comprises a post having a first end anchored to said base and a second threaded end extending therefrom, said thumb-switch being threaded on said post and tightenable toward said base for compressing said collar therebetween.

10. The caulk dispensing device according to claim 9, wherein said collar has in inwardly disposed lip overlapping a periphery of said base and in rotatable contact therewith, said thumb-switch being tightenable toward said base for compressing said overlapping lip therebetween.

11. The caulk dispensing device according to claim 10, wherein said clamp further comprises at least one washer in bearing contact with said thumb-switch.

12. The caulk dispensing device according to claim 7, wherein a rim of both cupped sides of said plunger is flared outward to insure a fluid-tight seal against an interior of said barrel.

13. The caulk dispensing device according to claim 12, wherein said plunger is formed from a chemical resistant composition.

14. The caulk dispensing device according to claim 13, wherein said plunger is formed from chemical resistant rubber.

15. The caulk dispensing device according to claim 14, further comprising a piston head mounted on said end of said piston rod, an ejecting cone for emptying said barrel of caulk, a screw threaded into said piston head through said ejecting cone and plunger, respectively, for securing said ejecting cone and plunger to said piston head.

* * * * *